US012602869B2

(12) United States Patent
Mulligan

(10) Patent No.: US 12,602,869 B2
(45) Date of Patent: Apr. 14, 2026

(54) APPARATUS, SYSTEMS AND METHODS FOR PROCESSING IMAGES

(71) Applicant: Sony Interactive Entertainment Inc., Tokyo (JP)

(72) Inventor: Paul Terence Mulligan, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 433 days.

(21) Appl. No.: 18/311,947

(22) Filed: May 4, 2023

(65) Prior Publication Data

US 2023/0368470 A1 Nov. 16, 2023

(30) Foreign Application Priority Data

May 11, 2022 (GB) .................................... 2206890.2

(51) Int. Cl.
*G06T 7/40* (2017.01)
*G06T 7/70* (2017.01)
*G06T 17/20* (2006.01)

(52) U.S. Cl.
CPC ............... *G06T 17/20* (2013.01); *G06T 7/40* (2013.01); *G06T 7/70* (2017.01); *G06T 2207/20164* (2013.01); *G06V 2201/07* (2022.01)

(58) Field of Classification Search
None
See application file for complete search history.

(56) References Cited

U.S. PATENT DOCUMENTS

| | | | |
|---|---|---|---|
| 11,010,951 | B1 | 5/2021 | Schwartz |
| 2019/0240577 | A1 | 8/2019 | Oshima |
| 2020/0094134 | A1 | 3/2020 | Marchesi |
| 2020/0312042 | A1 | 10/2020 | Sardari |
| 2021/0005003 | A1 | 1/2021 | Chong |

FOREIGN PATENT DOCUMENTS

| | | |
|---|---|---|
| WO | 2018069269 A1 | 4/2018 |
| WO | 2018087268 A1 | 5/2018 |

OTHER PUBLICATIONS

Extended European Search Report for corresponding EP Application No. 23171024.5, 7 pages, dated Sep. 27, 2023.
Combined Search and Examination Report for corresponding GB Application No. 2206890.2, 5 pages, dated Nov. 14, 2022.

*Primary Examiner* — Nicholas R Wilson
(74) *Attorney, Agent, or Firm* — Fish & Richardson P.C.

(57) ABSTRACT

A data processing apparatus includes receiving circuitry to receive one or more first images comprising a plurality of real-world objects, processing circuitry to detect one or more respective real-world objects in one or more of the first images where, for each detected real-world object, the processing circuitry is configured to generate a respective texture in dependence upon pixel data for the detected real-world object and to associate the respective texture with predefined mesh data to create a respective game asset for the detected real-world object, storage circuitry to store one or more respective game assets for one or more of the detected real-world objects and rendering circuitry to generate one or more images for display including one or more of the respective game assets.

20 Claims, 4 Drawing Sheets

410

420

430

200     210

Receiving circuitry

220

Processing circuitry

230

Storage circuitry

240

Rendering circuitry

250

Selection circuitry

APPARATUS, SYSTEMS AND METHODS FOR PROCESSING IMAGES

BACKGROUND OF THE INVENTION

Field of the Invention

The present disclosure relates to apparatus, systems and methods for processing images. In particular, the present disclosure relates to apparatus, systems and methods for processing images for creation of game assets.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Networked video games exist in which two or more computing devices are connected to each other via a network to exchange information during a game session. Users can thus participate in a networked game using their respective computing devices to remotely compete against or play with other users for a variety of video game applications.

Networked multiplayer board games allow users to remotely compete against each other using computer generated stock images, such as stock images of chess pieces. However, such techniques can result in users feeling a lack of interaction with an opposing player, and more generally a lack of human interaction when moving virtual elements within a display image using a pointing device and waiting for an opponent to subsequently update the display image.

Conventional table top games exist in which two or more users may play with each other using various objects (e.g. chess pieces or other models or figurines, checkers pieces, cards, dice etc.) In particular, table top games such as board games, card games, dice games and miniature war games may be played using various objects that are available to a user. Whilst networked multiplayer video games have seen advances in recent years, for many table top games using physical objects there is still a requirement for users to be physically present at a same location in order to participate in conventional table top games. In particular, for a table top game in which users play using their collection of items (such a trading cards and/or figurines), there is a requirement for users to be physically present at a same location.

It is in the context of the above arrangements that the present disclosure arises.

SUMMARY OF THE INVENTION

Various aspects and features of the present invention are defined in the appended claims and within the text of the accompanying description.

BRIEF DESCRIPTION OF THE DRAWINGS

The present technique will be described further, by way of example only, with reference to embodiments thereof as illustrated in the accompanying drawings, in which.

DESCRIPTION OF THE EMBODIMENTS

In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
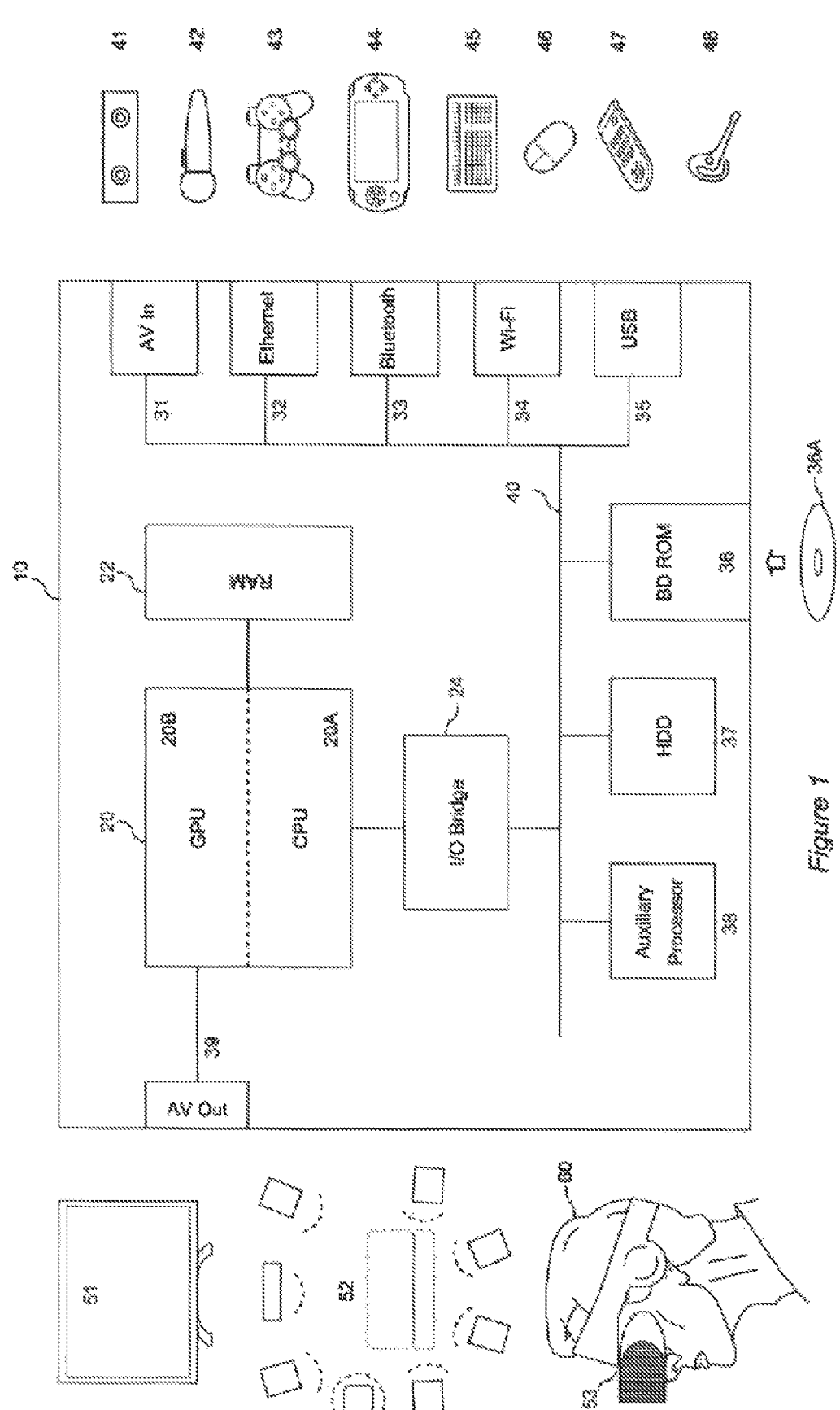
FIG. 1 is a schematic diagram illustrating a computer game processing apparatus.

Referring now to the drawings, wherein like reference numerals designate identical or corresponding parts throughout the several views, FIG. 1 schematically illustrates the overall system architecture of a computer game processing apparatus such as the Sony® PlayStation 4® entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the DualShock 4 ® or DualSense®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, processes data and generates video images (image data) and optionally audio for output via the AV output 39. Optionally, the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

FIG. 1 therefore provides an example of a data processing apparatus suitable for performing graphics processing operations for generating images for display by a display device.

Figures 2, 3:
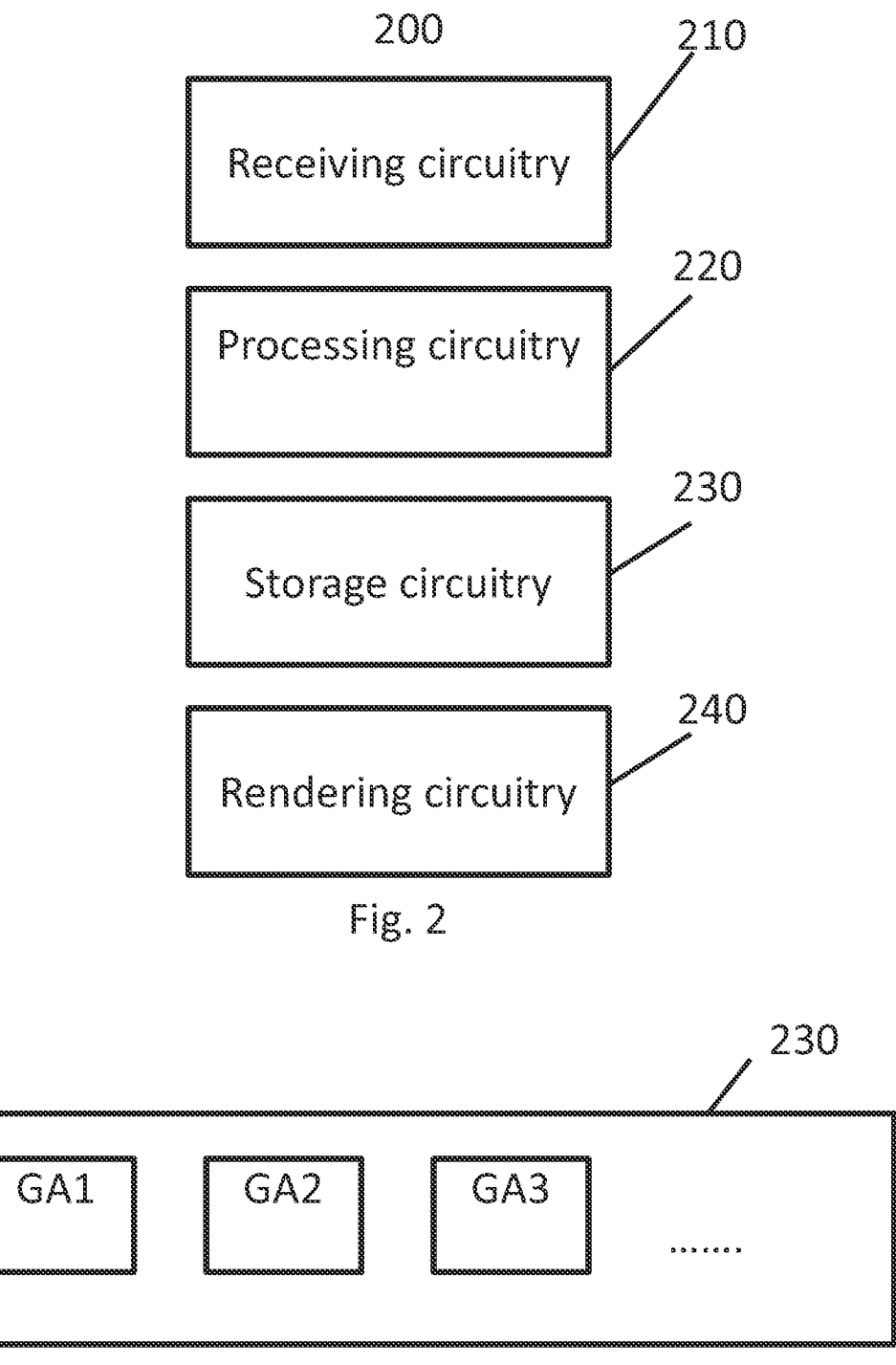
FIG. 2 is a schematic diagram illustrating a data processing apparatus.
FIG. 3 is a schematic diagram illustrating respective sets of game assets obtained for different users.

FIG. 2 schematically illustrates a data processing apparatus 200 comprising receiving circuitry 210, processing circuitry 220, storage circuitry 230 and rendering circuitry 240. In embodiments of the disclosure, the data processing apparatus 200 comprises: receiving circuitry 210 to receive one or more first images comprising a plurality of real-world objects; processing circuitry 220 to detect one or more respective real-world objects in one or more of the first images, wherein for each detected real-world object, the processing circuitry 220 is configured to generate a respective texture in dependence upon pixel data for the detected real-world object and to associate the respective texture with predefined mesh data to create a respective game asset for the detected real world object; storage circuitry 230 to store one or more respective game assets for one or more of the detected real-world objects; and rendering circuitry 240 to generate one or more images for display including one or more of the respective game assets.

The data processing apparatus 200 may for example be provided as part of an entertainment device, such as a game console, smartphone device, laptop or a general purpose computing device. For example, the data processing apparatus 200 may be provided as part of a computer game processing apparatus such as that shown in FIG. 1.

Alternatively, the data processing apparatus 200 may be provided as part of a server so as to communicate, via a network, with user devices associated with any number of users and receive images from the user devices for creation of game assets based on the received images.

More generally, the data processing apparatus 200 comprises the receiving circuitry 210 that is operable to receive one or more images comprising a plurality of real-world objects. The receiving circuitry 210 may receive the one or more images via a wired or wireless communication (e.g. Wi-Fi® or Bluetooth®) with another device. For example, the receiving circuitry 210 can be operable to communicate with a user's smartphone device to receive one or more images captured by an image sensor of the user's smartphone device. In some examples, the receiving circuitry 210 is operable to receive one or more images via a wireless network such as a PAN, LAN or a WAN.

In some examples, the data processing apparatus 200 comprises one or more image sensors operable to capture one or more images, and the receiving circuitry 210 is operable to receive one or more of the images captured by the image sensor(s). In some examples, the data processing apparatus 200 comprises one or more image sensors and memory for storing images captured by the image sensor(s) so that images can be stored and retrieved from the memory by the receiving circuitry 210.

For example, as part of a setup stage (or initialisation stage), a first user may capture one or more images including objects intended to be used by the first user in a game. In some examples, the first user may arrange each object that is to be used during the game so as to capture a single image comprising each of the objects. For example, in the case of a trading card game, a user may arrange a plurality of trading cards on a surface and capture a single image comprising the trading cards intended to be used by the first user. Alternatively or in addition, the first user may capture a sequence of images each including one or more objects such that that the set of captured images includes a set of objects to be used by the user for the game.

In some examples, the real-world objects may correspond to miniature figurines or playing cards (or any other suitable object used in a traditional table top game), such that the user captures images of these objects to define a set of objects that is to be used in a game with another user. The another user may similarly capture one or more images to specify a set of objects to be used by the other user.

The above mentioned captured images can either be received by the data processing apparatus 200 whilst the images are being captured so as to sequentially receive images whilst capture of the images is on-going, or the above mentioned captured images may be stored by a user's device (or stored in a user's cloud storage space) and the one or more stored images can be received by receiving circuitry 210 when requested by a user.

Captured images including real-world objects can thus be obtained and processed by the data processing apparatus 200 for creating respective game assets. In particular, the data processing apparatus 200 is operable to detect real-world objects in the received images and use pixel data for a detected real-world object for creating a game asset. In this way, real-world objects can be ingested for game asset creation. A user can specifically choose one or more of their associated real-world objects and capture images of these objects (using any suitable image sensor technology, such as an image sensor of a smartphone device) and the data processing apparatus 200 can generate corresponding game assets for the real-world objects to obtain a collection of game assets corresponding to the user's real world objects. For example, a user may arrange their collection of playing cards and/or miniature models for a given table top game on a surface of a table and capture one or more images of the objects. The captured images can thus be processed by the data processing apparatus 200 for creating game assets for the user that are based on the user's collection of real-world objects.

The data processing apparatus 200 is operable, using the receiving circuitry 210, to receive one or more first images associated with a first user, in which the first images associated with the first user comprise real-world objects for which game assets are to be generated. For example, in the case of a miniature war game or a trading card game (e.g. Pokemon®) the first user may place all of the objects intended to be used on a surface and capture one or more images including the objects. In this way, game assets can be created for one or more of the first user's real world objects.

Optionally, the data processing apparatus 200 is operable to receive one or more second images associated with a second user so as to generate game assets using the second images associated with the second user. The second user may similarly capture one or more images including their associated real-world objects for which game assets are to be created.

More generally, the receiving circuitry 210 can be configured to receive images associated with any number of users, and the processing circuitry 220 can be configured to generate a set of game assets for each user based on the one or more images received for each user.

In the following discussion the terms first image and second image are used to specify images associated with different users and, unless specified otherwise, references herein to images more generally refer to processing that can be performed for any of the first and second images.

Generally, the processing circuitry 220 is operable to process an image to detect a respective real-world object in the image and to generate a texture using the pixel data for the respective real-world object in the image. The processing circuitry 220 is configured to detect one or more respective real-world objects in one or more of the images received by the receiving circuitry 210, wherein for each detected real-world object, the processing circuitry 220 is configured to generate a respective texture in dependence upon pixel data for the detected real-world object and to associate the respective texture with predefined mesh data to create a respective game asset for the detected real world object.

The processing circuitry 220 is operable to execute one or more computer vision algorithms for detecting one or more objects in an image. Any suitable object detection algorithm(s) or combination thereof may be used. For example, the processing circuitry 230 may be operable to execute one or more contour detection algorithms for detecting one or more respective objects in a captured image. In a simplest case, a respective captured image may comprise one or more playing cards arranged on a flat surface such that a face of the card is present in the image and a contour defining the outline of the card can be detected. In particular, placement of a playing card on a surface with a colour that is different to that of the card may assist in more reliably detecting the presence of the edges of the card in the captured image. In the case of an image comprising a plurality of respective playing cards (e.g. trading cards), contours can be detected for the respective cards to detect respective image regions corresponding to the respective cards. Therefore, based on contour detection, a portion of an image corresponding to an object can be detected and, as explained in more detail below, pixel data for that portion of the image can be extracted for asset creation.

In some embodiments of the disclosure, the processing circuitry 220 is operable to execute at least one corner detection algorithm for detecting one or more corners associated with an object in a captured image. The Harris corner detection algorithm is one example of an algorithm that may be suitable for this. The processing circuitry 220 can detect corners in an image and detect an object on the basis of the positions of the corners. In a simplest case, a captured image may comprise a single playing card having four corners and a region bounded by the four corners with straight lines connecting the corners can be detected as corresponding to the object. In some examples, the processing circuitry 220 may be specifically programmed for detecting objects having four corners for assisting in detecting real-world objects corresponding to playing cards. In some examples, a combination of corner detection and contour detection may be used for object detection by detecting corners and contours connecting the corners.

Hence more generally, in some embodiments of the disclosure, the processing circuitry 220 is configured to detect a plurality of corners associated with a real-world object in a respective image and to extract the pixel data for the real-world object from a portion of the respective image in dependence upon positions of the corners. Optionally, the processing circuitry 220 can be configured to detect real-world objects based on detection of a predetermined number of corners. For example, the processing circuitry 220 may be operable to detect corners in an image and in response to detecting four corners (or more generally a predetermined number of corners) each within a threshold distance of each other, the processing circuitry 220 determines that the four corners define the boundary of the real-world object and a region bounded by the four corners and straight adjoining lines corresponds to the real-world object. This technique may be particularly beneficial in the case where the real-world objects correspond to playing cards (e.g. trading cards).

In some examples, one or more machine learning models trained for object detection may be used for detecting a portion of an image comprising an object. Machine-learning based object detection techniques are generally known and are not discussed in detail. For example, a machine learning model trained to detect presence of a miniature figurine or a playing card in an image may be used. In particular, training images comprising playing cards for a particular card game (e.g. conventional card games using a 52 card deck or trading card games such as Pokemon®) may be used for this purpose.

Alternatively or in addition, a database of images comprising images of predetermined figurines and/or predetermined cards associated with a predetermined table top game may be used by the processing circuitry 220 as part of the object detection. Any of the above mentioned object detection techniques may be performed to detect an object in an image, and a comparison of the image data for the detected object with the images of the database can be performed to determine whether the detected object matches a predetermined object included in the database. In a simplest case, a detected image portion may be compared with each predetermined object of the database to determine whether there is a match. Alternatively or in addition, one or more data filtering stages based on one or more properties such as colour, relative dimensions, number of corners etc. may be used to firstly select candidates from the database for comparison with the detected image portion.

Hence more generally, the processing circuitry 220 can be configured to detect a real-world object in a captured image, determine whether the detected real-world object matches a predetermined object in a database, and generate a texture for the detected real-world object in dependence upon whether the detected real-world object matches a predetermined object in the database. In this way, a set of detected real-world objects each corresponding to a predetermined object stored in a database can be identified and used to create a set of game assets.

In some embodiments of the disclosure, the data processing apparatus 200 optionally comprises a database to store a plurality of predetermined images for a first predetermined table top game, wherein the processing circuitry 220 is configured to create a game asset for a detected real-world object in a received image dependence upon whether the detected real-world object matches a predetermined image of the plurality of predetermined images. The processing circuitry 220 can be configured to detect a respective real-world object in an image, and determine whether the detected real-world object matches a predetermined image of the plurality of predetermined images for the first predetermined table top game. Therefore, a condition of whether a detected object matches a predetermined image of the database can be used to so as to create a game asset when the real-world object matches a predetermined image of the database. In this way, a condition that the real-world object matches a predetermined image (e.g. a predetermined model associated with a given miniature war game) can be used so that real-world objects present in the images but not intended for a given game can be removed from the processing for asset creation (by not generating a texture) and this can assist in obtaining a set of game assets for a predetermined game or a predetermined type of game.

In some examples, the data processing apparatus 200 comprises a first database storing the plurality of predetermined images for the first predetermined table top game and a second database storing a plurality of predetermined images for a second predetermined table top game. For example, the first database may correspond to a card game such as the Pokemon® trading card game, and the second database may correspond to a miniature war game such as Warhammer®. In some examples, a user can provide an input to select one of the first and second databases for evaluation with respect to their images.

Optionally, the database can be configured to store the plurality of predetermined images for the first predetermined table top game and to also store a predetermined texture in association with each predetermined image. Therefore, in some examples when a detected real-world object matches a predetermined image, the predetermined texture associated with the predetermined image may be used by the processing circuitry 220 for creating a game asset using the predefined mesh data.

More generally, the processing circuitry 220 is configured to detect one or more portions of an image corresponding to one or more real-world objects. The portion of an image corresponding to a real-world object can thus be identified and used for generating a texture (texture data) for creation of a game asset. The processing circuitry 220 is operable to extract pixel data for the pixels included in a portion of an image that has been identified as including a detected real-world object.

Depending on the capability of the image sensor that captured the image and/or any image compression that may or may not have been applied, the images received by the receiving circuitry 210 can have a range of formats. For example, the images received by the receiving circuitry 210 may have an image file format such as PNG or JPEG and may have any suitable image resolution. Generally, a received image comprises an array of pixels, in which a bit depth of n-bits is associated with each pixel and is indicative of pixel colour. For example, the pixel data may comprise 8, 12, 16, 24 or 30-bit pixel data per pixel.

The processing circuitry 220 is operable to extract the pixel data for a portion of an image comprising a real-world object and generate a texture in dependence upon the pixel data. As explained in more detail later, the generated texture is to be associated with predefined mesh data defining a polygonal mesh to thereby create a game asset to be rendered by the rendering circuitry 240. The texture is to be applied to the polygonal mesh during rendering to apply surface detail to the polygonal mesh. The processing circuitry 220 is thus operable to use a portion of a received image for generating a texture for use in texturing a predefined polygonal object.

It will be appreciated that depending on the configuration of the image sensor relative to the real-world object, the portion of the image corresponding to the real-world object may or may not have an aspect ratio and/or size suitable for generating a texture without requiring adjustment. In some examples, where a respective captured image includes a playing card located at the centre of the image, the pixel data extracted for the region corresponding to the playing card may be used to generate a texture with a same size and/or aspect ratio. For example, during image capture, a user (e.g. the first and/or second user discussed previously) may view a video feed on a screen of their device (e.g. smartphone device) and one or more alignment indicators may be included in the images displayed by the screen to provide visual feedback for assisting the user in capturing an image in which a playing card is correctly arranged (position and orientation) within the image. In particular, an alignment indicator comprising a perimeter of a rectangle or a rectangle with a fill (interior) that is partially or fully transparent may be displayed to assist the user in aligning the playing card in a captured image.

In some embodiments of the disclosure, the processing circuitry 220 is configured to generate a respective texture according to a predetermined aspect ratio and/or a predetermined size. The processing circuitry 220 can be configured to extract the pixel data for a portion of an image, in which the extracted pixel data has a given shape and size depending on the arrangement of the real-world object with respect to the image sensor, and the processing circuitry 230 is operable to adjust the extracted pixel data according to the predetermined aspect ratio and/or the predetermined size to obtain adjusted pixel data. Preferably, a predetermined aspect ratio of 1:1, 1:Sqrt(2), 1:2, 1:4, 1:8 or 1:16 may be used for improved processing efficiency for the texture. Alternatively or in addition, a predetermined size for the texture may be used such as $2^n \times 2^m$ (where m and n are whole numbers and may or may not be equal). In some examples, a predetermined size of 1024×1024 pixels may be used for generating a texture. However, it will be appreciated that any suitable predetermined dimensionality may be used for generating a texture using the extract pixel data. Optionally, the processing circuitry 220 is configured to perform one or more image warping operations and/or one or more image interpolation operations for adjusting the extracted pixel data to achieve an aspect ratio and/or size that is substantially the same as the predetermined aspect ratio and/or the predetermined size.

Alternatively or in addition, the pixel data for a respective real-world object may optionally be used to generate a plurality of smaller textures so that the plurality of textures together can be applied to the predefined polygonal mesh to apply the surface detail. Hence, in some examples the processing circuitry 220 is operable to extract the pixel data for a portion of an image comprising a real-world object and generate a plurality of textures in dependence upon the pixel data. Each of the plurality of textures can be associated with the predefined mesh data for thereby creating a respective game asset comprising a plurality of textures and the predefined mesh data, in which each of the plurality of textures is to be applied to a portion of the polygonal mesh defined by the predefined mesh data.

Hence more generally, the processing circuitry 220 is operable to extract the pixel data for a portion of an image comprising a real-world object and generate a texture in dependence upon the pixel data. The generated texture may for example be a bitmap image having a height and width which is to be applied to the surface of the polygonal mesh according to a predefined mapping. Generally, a texture coordinate corresponding to a corner of the texture is mapped to a given vertex and/or polygon of the predefined polygonal mesh data. Hence more generally, the processing circuitry 220 is operable to generate a texture in dependence upon the pixel data for the detected real-world object and a predetermined mapping can be used to map a predetermined texture coordinate (e.g. each corner coordinate) to a predetermined vertex of the predefined mesh data.

Hence, in some embodiments of the disclosure the processing circuitry 220 is configured to adjust at least one of a size and an aspect ratio associated with the extracted pixel data in dependence upon the predetermined size and/or the predetermined aspect ratio, and the processing circuitry 220 is configured to generate a respective texture in dependence upon the adjusted pixel data. The processing circuitry 220 can generate a first texture for a first detected real-world object and also generate a second texture for a second detected real-world object, and the first and second textures can both be generated to have a size and/or aspect ratio that is substantially the same as the predetermined size and/or the predetermined aspect ratio. Consequently, even though the first and second detected real-world objects may have different sizes and/or shapes in the captured image, processing can be performed by the processing circuitry 220 to obtain respective textures that have substantially the same size and/or aspect ratio.

The storage circuitry 230 is configured to store one or more respective game assets for one or more of the detected real-world objects. In some examples, the storage circuitry 230 is configured to store a respective game asset for each real-world object detected by the processing circuitry 230. The storage circuitry 230 may for example comprise one or more of a hard disk drive and a solid state drive for storage of such data. More generally, the data processing apparatus 200 is configured to store one or more of the respective game assets and the rendering circuitry 240 is configured to generate one or more images for display including one or more of the respective game assets stored by the storage circuitry 240. For example, an image may be generated by randomly selecting a stored game asset or a user may provide an input for selecting a respective game asset to be included in an image. Hence, data for a game asset created by the processing circuitry 230 can be stored and subsequently accessed by the rendering circuitry 240, to generate an image for display when appropriate.

One or more of the images generated for display may be output by a display unit (e.g. television 51) associated with the data processing apparatus 200 using a wired and/or wireless communication (e.g. Bluetooth®). Alternatively or in addition, the one or more images generated for display may be transmitted via a network and output by another display unit for display to another user different from the user that captured the images (optionally, any suitable image compression may be used for transmission of compressed image data). Hence, in some examples the images generated by the rendering circuitry 240 can be displayed to both a first user and a second user, thereby allowing the two users to view the images and select game assets for presenting in the images to thereby participate in a shared experience using their respective game assets corresponding to their real-world objects.

In some examples, the data processing apparatus 200 may be provided as part of a server such that the rendering is performed by the data processing apparatus 200 and the generated images are communicated, via a network, for display to one or more users. Moreover, in some examples the generated images are communicated, via a network, to two respective users having respective communication devices so as to allow the two users to view the rendered game assets and participate in a game using rendered game assets created based on captured images of the their real world objects. Knowledge by the data processing apparatus

200 of a given game that may be played by the users, and the associated rules, is not required and the two or more users can use their collection of game assets to, for example, compete against each other by selecting which game asset to play with. Optionally, in some examples the images generated by the rendering circuitry 240 comprise a user interface element comprising a graphical indicator which can be updated according to user inputs from the participating users. The graphical indicator may be updated to reflect an agreed score for a game.

Hence more generally, in some examples the receiving circuitry 210 is operable to receive a user input and the rendering circuitry 240 is operable to generate one or more of the images for display to include a user interface element in dependence upon the user input. In particular, in response to displaying a first image including a game asset associated with the first user and a game asset associated with the second user, the two users can each provide a user input (e.g. using any suitable input device such as a handheld controller, touch screen or camera-based gesture input) to indicate which of the two users is deemed to have won the encounter. For example, the user interface element may be updated to indicate a running score for a game between the two users, in which for each displayed image the users are required to agree on a winner and the user interface element is updated accordingly before proceeding to a next image.

In some embodiments of the disclosure, the storage circuitry 230 is configured to store a first plurality of respective game assets based on one or more first images, each of the first plurality of respective game assets corresponding to a respective detected real-world object. The receiving circuitry 210 can receive at least one first image that is associated with a first user, and detect a plurality of real-world objects based on the at least one first image, and each detected real-world object can be used for creating a game asset using the techniques discussed above. Therefore, a plurality of game assets can be created using the one or more first images and the plurality of game assets can be stored by the storage circuitry 230 for subsequent use by the rendering circuitry 240 for allowing the first user to play a game. In some examples, the first user can select from the plurality of game assets can be stored by the storage circuitry 230 to select a respective game asset to be used.

Hence, in some embodiments of the disclosure the one or more first images are associated with a first user and the first plurality of respective game assets correspond to game assets associated with the first user. The first plurality of respective game assets corresponding to game assets associated with the first user represent game assets that have been created using the first user's real-world objects In many image rendering processes, meshes are used to represent objects and textures are applied to these meshes. The predefined polygonal mesh data defines a plurality of vertices, edges and faces for defining a polyhedral object and the associated texture is to be used by the rendering circuitry 240 to apply image details to a surface of the object during rendering. The predefined polygonal mesh data may for example define an object such as a cuboid or a sphere. In particular, in some examples the predefined polygonal mesh data corresponds to a polyhedral object having at least one rectangular face with an aspect ratio in the range 1:N, where N is a value in the range 1 to 5. In some examples, N preferably has a value in the range 1.4 to 1.5. In particular, the at least one rectangular face may have an aspect ratio of 1:SQRT(2) for improved matching with a texture obtained from an image including a conventional playing card. Consequently, in some examples a received image comprises a real-world object that is a playing card and pixel data corresponding to the rectangular face of the playing card is extracted for generating a texture and the texture is associated with the predefined mesh data defining a polygonal object having at least one rectangular face having an aspect ratio of 1:SQRT(2).

It will be appreciated that in the above discussion the predefined mesh data may define at least one rectangular face, and the rectangular face may be defined by one or more from the list consisting of: a plurality of connected triangular faces; and one or more connected rectangular faces.

In some embodiments of the disclosure, each of the first plurality of respective game assets comprise the predefined mesh data. As explained above, the pixel data for a detected real-world object can be used for generating texture data that is in turn associated with predefined mesh data to create a respective game asset. In some embodiments of the disclosure, the predefined mesh data is the same for each of the first plurality of respective game assets. For example, the predefined mesh data may define a three-dimensional model such as a sphere or a cuboid. Hence, a plurality of respective game assets can be created which each comprise a different texture and each comprise the same predefined mesh data defining a same polygonal mesh. For example, each of the plurality of respective game assets may comprise predefined mesh data defining an object having a shape of a playing card, for which the texture is to be applied to a surface of the object. In this way, the rendering circuitry 240 can be configured to generate one or more images for display comprising one or more rendered game assets each including an object having a shape of a playing card (or a sphere or another suitable shape) with a different texture applied thereto.

In some embodiments of the disclosure, the one or more first images are associated with a first user and the first plurality of respective game assets correspond to game assets associated with the first user, wherein the storage circuitry 230 is configured to store the first plurality of respective game assets in association with a user account for the first user. The storage circuitry 230 can be configured to store the first plurality of respective game assets in association with a user account such that a user can log into the user account (e.g. using one or more of a password and biometric identification) to access their previously created game assets. For example, a user may have created a user account (e.g. PlayStation® Network account) using a user ID and a password so that the user can log into their account and access the first plurality of respective game assets stored in association with the user account. In some examples, the data processing apparatus 200 may be provided as part of a sever so as to store the game assets in association with a user account maintained by the server, and the stored game assets can be accessed by a user when logging into their account. In some examples, the storage circuitry 230 may store a plurality of respective game assets in association with the user account for the first user, and the first user can log into their account and update the plurality of respective game assets to add one or more additional game assets (e.g. by uploading one or more additional images) and/or remove one or more game assets. In particular, the first user may capture one or more additional first images for use by the data processing apparatus 200 to create one or more additional game assets to supplement their existing set of game assets.

In some embodiments of the disclosure, the receiving circuitry 210 is configured to receive one or more second images associated with a second user and comprising a plurality of real-world objects, and the storage circuitry 230 is configured to store a second plurality of respective game assets created by the processing circuitry 220 based on the one or more second images, each of the second plurality of respective game assets corresponding to a respective detected real-world object in the one or more second images. The receiving circuitry 210 can be configured to receive one or more first images for a first user and one or more second image for a second user, and the first images can be processed to create a first plurality of game assets for the first user and the second images can similarly be processed to create a second plurality of game assets for the second user.

FIG. 3 is a schematic diagram illustrating an example in which a first set of respective game assets GA1 is stored based on one or more first images associated with a first user, a second set of respective game assets GA2 is stored based on one or more second images associated with a second user, and a third set of respective game assets GA3 is stored based on one or more third images associated with a third user. Generally speaking, the data processing apparatus 200 can receive images for any number of users and create and store a respective set of game assets for the users, such that the storage circuitry 230 stores a respective set of game assets for use by a respective user in a multiplayer game.

The group of game assets GA1 may for example each comprise a texture generated in dependence upon pixel data for respective playing card objects detected in the images associated with the first user, and similarly the group of game assets GA2 may for example each comprise a texture generated in dependence upon pixel data for respective playing card objects detected in the images associated with the second user. Therefore, the groups of game assets GA1 and GA2 can be used by the two users to remotely play a card-based game together in which the groups of game assets GA1 and GA2 have been created according to real-world playing cards available to the users. A card-based game such as poker or another game using conventional cards or trading cards may be implemented. In some examples, the groups of games assets GA1, GA2, GA3 may relate to a collectable card game (CCG) such that a user can use their group of game assets (e.g. GA1) to compete against another user using their group of game assets (e.g. GA2).

Alternatively or in addition, the group of game assets GA1 may comprise one or more game assets comprising a texture generated in dependence upon pixel data for one or more respective miniature figures (miniature models) associated with the first user. Collectable miniature figures associated with miniature war gaming having a height in the range 1-30 cm conventionally used in a role-playing table top game may be used in the above mentioned game asset creation techniques. Hence, in some examples a user can use their group of game assets (e.g. GA1) to compete against another user using their group of game assets (e.g. GA2) using game assets corresponding to miniature models.

Hence more generally, the group of game assets GA1 may comprise one or more game assets corresponding to real-world objects for a given table top game (e.g. a game using playing cards, miniature figures or other similar objects or a combination thereof). The groups of game assets GA1 and GA2 (and similarly GA3) may comprise one or more game assets corresponding to real-world objects for the same table top game, and as such the game assets GA1 and GA2 can be used for remotely playing the table top game via images generated for display by the data processing apparatus 200.

In some embodiments of the disclosure, the one or more second images are associated with a second user and the second plurality of respective game assets (e.g. GA2) correspond to game assets associated with the second user, wherein the storage circuitry 230 is configured to store the second plurality of respective game assets in association with a user account for the second user. Generally, the storage circuitry 230 can be configured to store a set of respective game assets in association with a user account for a user, and respective users can log into their accounts to access their set of game assets and thereby use their game assets for participating in a game with other users.

Techniques for generating images for display including one or more game assets associated with one user and one or more game assets associated with another user will now be discussed.

In some embodiments of the disclosure, the rendering circuitry 240 is configured to generate at least one image for display comprising a respective game asset of the first plurality of respective game assets (e.g. GA1) and a respective game asset of the second plurality of respective game assets (e.g. GA2). The rendering circuitry 240 can be configured to generate an image for display comprising: a first game asset created based on one of the first user's real world objects; and a second game asset created based on one of the second user's real world objects.

Figure 4:
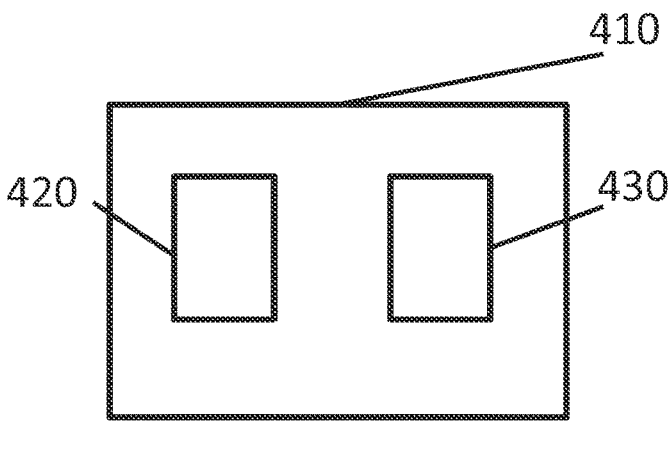
FIG. 4 is a schematic diagram illustrating an image for displaying rendered game assets.

In some examples, a first region of a display image may be used for displaying a first game asset for a first user and a second region of the display image may be used for displaying a second game asset for a second user. FIG. 4 is a schematic diagram illustrating an example of an image 410 generated for display by the rendering circuitry 240. The image 410 comprises a first region 420 to be used for displaying a first game asset for a first user and a second region 430 to be used for displaying a second game asset for a second user. In the example shown, the two regions are shown as having a rectangular shape suitable for displaying a game asset for a playing card, however, the two regions may have any suitable shape and may be square or circular in some examples. For example, the shape of the two regions may correspond to a polygonal shape associated with the predefined mesh data for a game asset. Hence more generally, the first region 420 can be used for displaying one or more game assets to be used by the first user and the second region 430 can be used for displaying one or more game assets to be used by the second user to thereby compete with each other. The rendering circuitry 240 can be configured to generate a sequence of respective images like that shown in FIG. 4.

Users can thus select, from their set of game assets, a respective game asset and the first region 420 and second region 430 can be updated to include the rendered game assets. Alternatively, the data processing apparatus 200 can be configured to automatically select a game asset from the sets GA1 and GA2 for use in the image 410 using a random selection.

The rendering circuitry 240 can be configured to generate a sequence of images, in which each image comprises a first game asset for a first user selected from the first plurality of game assets GA1 for the first user and a second game asset for a second user selected from the second plurality of game assets GA2 for the second user. For example, a random selection may be used to randomly select a first game asset from the group of game assets GA1, and similarly a random selection may be used to randomly select a second game asset from the group of game assets GA2. In some examples, the rendering circuitry 240 generates an image for display by randomly selecting one of the game assets GA1 and randomly selecting one of the game assets GA2, then a subsequent image is generated for display by randomly selecting another of the game assets GA1 and randomly selecting another of the game assets GA2, in which a game assets used in a previous image is not available for selection for generating a subsequent image.

Figure 5:
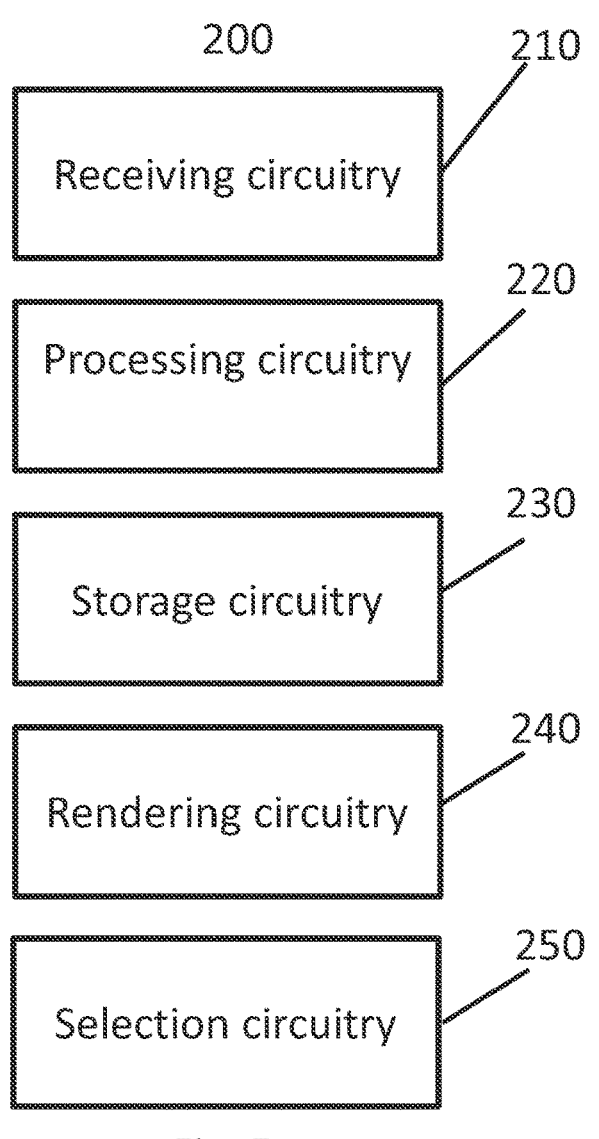
FIG. 5 is a schematic diagram illustrating a data processing apparatus comprising selection circuitry for selecting game assets responsive to user inputs.

Referring now to FIG. 5, in some embodiments of the disclosure the data processing apparatus 200 comprises selection circuitry 250 to select the respective game asset of the first plurality of respective game assets from the first plurality of respective game assets in response to a selection input from a first user and to select the respective game asset of the second plurality of respective game assets from the second plurality of respective game assets in response to a selection input from a second user. The first user can provide a selection input with respect to the first plurality of game assets GA1 to select one of the game assets to be used in a next image generated by the rendering circuitry 240. Similarly, the second user can provide a selection input with respect to the second plurality of game assets GA2 to select one of the game assets to be used in the next image generated by the rendering circuitry 240. In this way, the two users can select, from their created game assets, which game assets are to be used.

For example, the first user may view a graphical user interface comprising each of their game assets GA1 and provide a selection input (e.g. using a pointing device or any suitable input device) to select a respective game asset to be used in a next image. The second user may similarly select a respective game asset from their game assets GA2.

In some embodiments of the disclosure, the processing circuitry 220 is configured to detect an optically detectable marker associated with a real-world object and to verify that each of the first plurality of respective game assets corresponds to a respective real-world object having a different optically detectable marker. The processing circuitry 220 can detect one or more optically detectable markers in a captured image such as a barcode (e.g. a 1D barcode comprising spaced parallel lines or a 2D barcode, or specifically a QR code). For example, a miniature figure or a playing card may have an optical marker provided on an external surface thereof and the processing circuitry 220 can detect presence of such an optical marker in a captured image including the object. In particular, object detection can be performed to detect an object in a captured image, and the pixel data for the object can be analysed to detect presence of an optical marker in the pixel data.

The processing circuitry 220 can thus detect optical markers and verify that each of the first plurality of respective game assets obtained for the first user corresponds to a respective real-world object having a different optically detectable marker to thereby ensure that a same real-world object has not been used to create multiple game assets. This may be beneficial for certain table top games, such as a trading card game where a manufacturer provides respective objects having unique markers. In particular, in the case of a trading card game or miniature war game, or other similar table top game, a user may potentially seek to create multiple assets using a single real-world object (e.g. user has only a single playing card of a certain class or level that may be rare and attempts to create two or more assets using the same card), and the data processing apparatus 200 can be operable to restrict a number of assets that can be created using a single real-world object.

The processing circuitry 220 can be configured to check whether a detected marker associated with a real-world object matches a previously detected marker associated with a previously detected real-world object prior to creating a game asset for the real-world object. The processing circuitry 220 can be configured to create a game asset (using the technique discussed above) and the storage circuitry 230 can be configured to store the game asset in association with information indicative of the optical marker associated with the game asset. The processing circuitry 220 can detect another real-world object for which asset creation is to be performed and can verify that the optical marker associated with the another real-world object is a new optical marker that does not match a marker stored in association with a game asset stored by the storage circuitry 240. In response to determining that the detected marker is not a new marker (i.e. matches a previously detected marker), the processing circuitry 220 can stop processing for the detected real-world object so that a game asset can be prevented from being created for the real-world object. In the case where the processing circuitry 220 stops asset creation, this can ensure that the set of game assets created for a user (e.g. GA1) comprises game assets that each correspond to a unique real-world object and that a same object has not been used for creation of two or more game assets. However, in response to determining that the detected marker is a new marker (i.e. does not match a previously detected marker), the processing circuitry 220 can perform processing for the detected real-world object to generate a texture and associate the texture with the predefined mesh data to thereby create a game asset.

Alternatively, in some examples the processing circuitry 220 can be configured to detect a real-world object and create a game asset for the detected real-world object and subsequently verify whether each of the created game assets has a unique optical marker. Hence, processing for creation of a game asset can be performed to obtain a set of game assets, the storage circuitry 230 can be configured to store the game assets in association with information indicative of the optical marker associated with the game asset, and the processing circuitry 220 can verify that each of the optical markers is a unique optical marker. In this case, a set of game assets can thus be obtained and, in response to determining that two or more game assets have a same optical marker, the processing circuitry 220 can be configured either to assign indicator data the two or more game assets for indicating that the two or more game assets correspond to a same real-world object or remove one or more of the game assets from the storage.

In some embodiments of the disclosure, the receiving circuitry 210 is configured to receive one first image (a single first image) comprising the plurality of real-world objects and the storage circuitry 230 is configured to store the first plurality of respective game assets (e.g. GA1) based on the first image, each of the first plurality of respective game assets corresponding to a respective detected real-world object in the first image. A respective first image may be captured by a user and used by the data processing apparatus 200 for generating a plurality of game assets to be used by a given user. By requiring each of the real-world objects to be captured in only a single image and consequently each viewed simultaneously by an image sensor, a user can be prevented from capturing multiple images of a same real world object and thereby attempting to create a plurality of game assets using a same real world object (e.g. creating two or more game assets when in fact the user only possesses a single instance of a miniature figurine/a rare trading card).

Hence in some embodiments of the disclosure, the receiving circuitry 210 is configured to receive one first image comprising the plurality of real-world objects associated with the first user and to receive one second image comprising the plurality of real-world objects associated with the second user, the storage circuitry 230 is configured to store the first plurality of respective game assets created by the processing circuitry 220 based on the first image and to store the second plurality of respective game assets created by the processing circuitry 220 based on the second image, such that each of the first plurality of respective game assets corresponds to a respective detected real-world object in the first image and each of the second plurality of respective game assets corresponds to a respective detected real-world object in the second image. In this way, the users can be inhibited from creating two or more game assets for a single real-world object thereby improving security.

It will be a appreciated that if appropriate, subsequent individual higher quality images can be captured, for example using the low-resolution images from the group image as prompts to the user and optionally as templates for cross-checking (e.g. by comparing a down-sized version of the new capture with the prompt image), to ensure that the new high quality images correspond to the assets in the group image.

Figure 6:
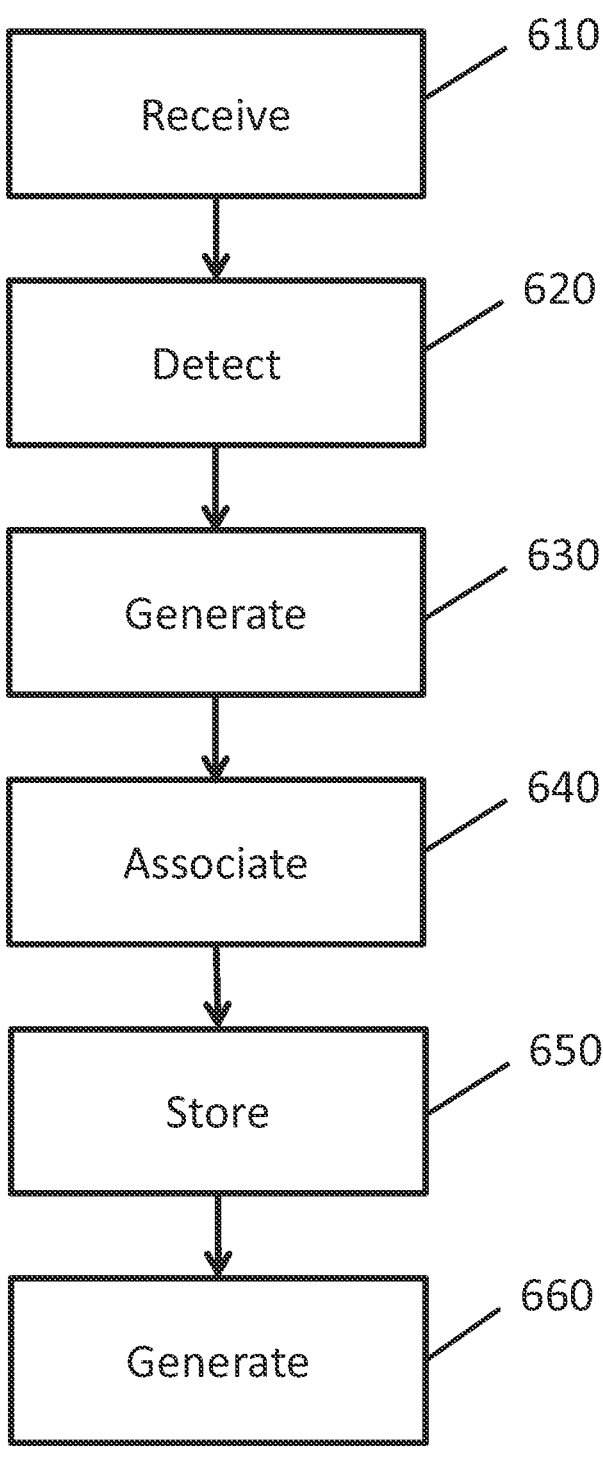
FIG. 6 is a schematic diagram illustrating a data processing method.

Referring now to FIG. 6, in embodiments of the disclosure a data processing method comprises: receiving (610) one or more first images comprising a plurality of real-world objects; detecting (620) one or more respective real-world objects in one or more of the first images; for each detected real-world object, generating (630) a respective texture in dependence upon pixel data for the detected real-world object and associating (640) the respective texture with predefined mesh data to create a respective game asset for the detected real world object; storing (650) one or more respective game assets for one or more of the detected real-world objects; and generating (660) one or more images for display including one or more of the respective game assets.

It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

Thus any required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

It will also be apparent that numerous modifications and variations of the present disclosure are possible in light of the above teachings. It is therefore to be understood that within the scope of the appended claims, the disclosure may be practised otherwise than as specifically described herein.

The invention claimed is:

1. A method, comprising:

receiving one or more first images comprising a plurality of real world objects;

detecting one or more respective real world objects in one or more of the first images by detecting a plurality of corners for each real world object in the one or more first images;

for each detected real world object:

extracting pixel data from within a geometric region bounded by the plurality of detected corners associated with the detected real world object in a corresponding first image;

generating a respective texture based upon the extracted pixel data for the detected real world object;

associating the respective texture with predefined mesh data to create a respective game asset for the detected real world object;

storing one or more respective game assets for one or more of the detected real world objects; and generating one or more images for display including one or more of the respective game assets.

2. The method of claim 1, wherein detecting one or more respective real world objects in one or more of the first images by detecting a plurality of corners for each real world object in the one or more first images comprises executing one or more contour detection algorithms to identify the plurality of corners for each real world object.

3. The method of claim 1, wherein generating a respective texture based upon the extracted pixel data for the detected real world object comprises generating the respective texture according to at least one of a predetermined aspect ratio or a predetermined size.

4. The method of claim 1, wherein generating a respective texture based upon the extracted pixel data for the detected real world object comprises applying a geometric warping operation to the extracted pixel data to meet at least one of a predetermined aspect ratio or a predetermined size.

5. The method of claim 1, wherein generating a respective texture based upon the extracted pixel data for the detected real world object comprises applying an image interpolation operation to the extracted pixel data to meet at least one of a predetermined aspect ratio or a predetermined size.

6. The method of claim 1, wherein associating the respective texture with predefined mesh data to create a respective game asset for the detected real world object comprises mapping one or more corners of the respective texture with one or more vertices of the predefined mesh data.

7. The method of claim 1, further comprising:

detecting an optically detectable marker associated with each real world object of the plurality of real world objects; and verifying that each optically detectable marker associated with each real world object is unique.

8. The method of claim 7, further comprising:

detecting an optically detectable marker associated with a first real world object matches to a previously detected optically detectable marker associated with a prior real world object; and in response, preventing creation of a game asset associated with the first real world object.

9. The method of claim 7, wherein the optically detectable marker comprises at least one of a barcode or a QR code.

10. A system comprising:

one or more computers and one or more storage devices on which are stored instructions that are operable, when executed by the one or more computers, to cause the one or more computers to perform operations comprising:

receiving one or more first images comprising a plurality of real world objects;

detecting one or more respective real world objects in one or more of the first images by detecting a plurality of corners for each real world object in the one or more first images;

for each detected real world object:

extracting pixel data from within a geometric region bounded by the plurality of detected corners associated with the detected real world object in a corresponding first image;

generating a respective texture based upon the extracted pixel data for the detected real world object;

associating the respective texture with predefined mesh data to create a respective game asset for the detected real world object;

storing one or more respective game assets for one or more of the detected real world objects; and generating one or more images for display including one or more of the respective game assets.

11. The system of claim 10, wherein detecting one or more respective real world objects in one or more of the first images by detecting a plurality of corners for each real world object in the one or more first images comprises executing one or more contour detection algorithms to identify the plurality of corners for each real world object.

12. The system of claim 10, wherein generating a respective texture based upon the extracted pixel data for the detected real world object comprises generating the respective texture according to at least one of a predetermined aspect ratio or a predetermined size.

13. The system of claim 10, wherein generating a respective texture based upon the extracted pixel data for the detected real world object comprises applying a geometric warping operation to the extracted pixel data to meet at least one of a predetermined aspect ratio or a predetermined size.

14. The system of claim 10, wherein generating a respective texture based upon the extracted pixel data for the detected real world object comprises applying an image interpolation operation to the extracted pixel data to meet at least one of a predetermined aspect ratio or a predetermined size.

15. The system of claim 10, wherein associating the respective texture with predefined mesh data to create a respective game asset for the detected real world object comprises mapping one or more corners of the respective texture with one or more vertices of the predefined mesh data.

16. The system of claim 10, further comprising:

detecting an optically detectable marker associated with each real world object of the plurality of real world objects; and verifying that each optically detectable marker associated with each real world object is unique.

17. The system of claim 10, further comprising:

detecting an optically detectable marker associated with a first real world object matches to a previously detected optically detectable marker associated with a prior real world object; and in response, preventing creation of a game asset associated with the first real world object.

18. One or more non-transitory computer storage media encoded with computer program instructions that when executed by one or more computers cause the one or more computers to perform operations comprising:

receiving one or more first images comprising a plurality of real world objects;

detecting one or more respective real world objects in one or more of the first images by detecting a plurality of corners for each real world object in the one or more first images;

for each detected real world object:

extracting pixel data from within a geometric region bounded by the plurality of detected corners associated with the detected real world object in a corresponding first image;

generating a respective texture based upon the extracted pixel data for the detected real world object;

associating the respective texture with predefined mesh data to create a respective game asset for the detected real world object;

storing one or more respective game assets for one or more of the detected real world objects; and generating one or more images for display including one or more of the respective game assets.

19. The one or more non-transitory computer storage media according to claim 18, wherein detecting one or more respective real world objects in one or more of the first images by detecting a plurality of corners for each real world object in the one or more first images comprises executing one or more contour detection algorithms to identify the plurality of corners for each real world object.

20. The one or more non-transitory computer storage media according to claim 18, wherein generating a respective texture based upon the extracted pixel data for the detected real world object comprises generating the respective texture according to at least one of a predetermined aspect ratio or a predetermined size.

* * * * *